US012670553B2

(12) United States Patent

He et al.

(10) Patent No.: US 12,670,553 B2

(45) Date of Patent: Jun. 30, 2026

(54) METHOD AND APPARATUS FOR TRAINING IMAGE PROCESSING MODEL, ELECTRONIC DEVICE, COMPUTER-READABLE STORAGE MEDIUM, AND COMPUTER PROGRAM PRODUCT

(71) Applicant: TENCENT TECHNOLOGY (SHENZHEN) COMPANY LIMITED, Shenzhen (CN)

(72) Inventors: Keke He, Shenzhen (CN); Junwei Zhu, Shenzhen (CN); Ying Tai, Shenzhen (CN); Chengjie Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 133 days.

(21) Appl. No.: 18/813,622

(22) Filed: Aug. 23, 2024

(65) Prior Publication Data

US 2024/0420288 A1      Dec. 19, 2024

Related U.S. Application Data

(63) Continuation of application No. PCT/CN2023/123450, filed on Oct. 8, 2023.

(30) Foreign Application Priority Data

Nov. 9, 2022    (CN) .......................... 202211397807.4

(51) Int. Cl.
*G06T 5/50* (2006.01)
*G06T 5/70* (2024.01)
(Continued)

(52) U.S. Cl.
CPC .................. *G06T 5/50* (2013.01); *G06T 5/70* (2024.01); *G06T 9/00* (2013.01); *G06V 10/44* (2022.01);
(Continued)

(58) Field of Classification Search
CPC .... G06T 5/50; G06T 5/70; G06T 9/00; G06T 2207/20081; G06T 2207/20132;
(Continued)

(56) References Cited

U.S. PATENT DOCUMENTS

2021/0166088 A1    6/2021  Chen
2022/0004803 A1    1/2022  Li et al.
(Continued)

FOREIGN PATENT DOCUMENTS

CN        110826593  A        2/2020
CN        111783603  A        10/2020
(Continued)

OTHER PUBLICATIONS

Zhiliang Xu et al. "Mobilefaceswap: A lightweight framework for video face swapping.", (Jun. 28, 2022), Proceedings of the AAAI Conference on Artificial Intelligence. vol. 36. No. 3. Jun. 28, 2022, (Year 2022).*

(Continued)

*Primary Examiner* — Hai Tao Sun
(74) *Attorney, Agent, or Firm* — Anova Law Group, PLLC

(57) ABSTRACT

A model training method includes obtaining a training sample set including a triplet training sample that includes a source image, a template image, and a true value image, performing face swapping on the source image and the template image through a first image processing model having a re-parameterization structure to obtain a face-swapped image, obtaining a second image processing model (Continued)

Schematic diagram Showing a face-swapping effect corresponding to the first image processing model and being a pre-trained image processing model, calculating a fusion loss function of the first image processing model according to the second image processing model, the first face-swapped image, and the true value image, training the first image processing model according to the fusion loss function, and determining a model parameter of the first image processing model in response to a training convergence condition of the first image processing model being reached.

16 Claims, 6 Drawing Sheets

(51) Int. Cl.
  *G06T 9/00* (2006.01)
  *G06V 10/44* (2022.01)
  *G06V 10/75* (2022.01)

(52) U.S. Cl.
  CPC .. *G06V 10/751* (2022.01); *G06T 2207/20081* (2013.01); *G06T 2207/20132* (2013.01); *G06T 2207/20221* (2013.01); *G06T 2207/30201* (2013.01)

(58) Field of Classification Search
  CPC   G06T 2207/20221; G06T 2207/30201; G06V 10/75; G06V 10/44
  USPC ........................................................ 345/629
  See application file for complete search history.

(56) References Cited

U.S. PATENT DOCUMENTS

| | | | |
|---|---|---|---|
| 2022/0036058 A1* | 2/2022 | Sui ........................ | G06V 40/172 |
| 2023/0081982 A1 | 3/2023 | He et al. | |
| 2023/0319223 A1* | 10/2023 | Naruniec ............. | G06V 40/176 |
| | | | 348/239 |
| 2023/0342893 A1* | 10/2023 | Hinz ......................... | G06T 5/60 |

FOREIGN PATENT DOCUMENTS

| | | |
|---|---|---|
| CN | 111860043 A | 10/2020 |
| CN | 113411425 A | 9/2021 |
| CN | 114004772 A | 2/2022 |
| CN | 114387656 A | 4/2022 |
| CN | 114611700 A | 6/2022 |
| CN | 115294423 A | 11/2022 |
| WO | 2022179401 A1 | 9/2022 |

OTHER PUBLICATIONS

The World Intellectual Property Organization (WIPO) International Search Report for PCT/CN2023/123450 Jan. 4, 2024 7 Pages (including translation).
Generative Adversarial Architecture—Baidu Encyclopedia, https://baike.baidu.com/item/Gan/22181905, May 17, 2022 (May 17, 2022). 5 Pages (including translation).
The European Patent Office (EPO) The Extended European Search Report for Application No. 23887696.5 Sep. 19, 2025 8 Pages.
Zhiliang Xu et al. "Mobilefaceswap: A lightweight framework for video face swapping." Proceedings of the AAAI Conference on Artificial Intelligence. vol. 36. No. 3. 2022.
Bo Peng et al. "Dfgc 2021: A deepfake game competition." 2021 IEEE International Joint Conference on Biometrics (IJCB). IEEE, 2021.
What is the core technology of AI face-changing What other application, Microsoft Research Asia, Zhihu, Sep. 6, 2019.

* cited by examiner (A) Residual neural network  (B) RepVGG training  (C) RepVGG inference (A) Schematic diagram of a structure of an image processing model     (B) Schematic diagram of parameters of an image processing model

METHOD AND APPARATUS FOR TRAINING IMAGE PROCESSING MODEL, ELECTRONIC DEVICE, COMPUTER-READABLE STORAGE MEDIUM, AND COMPUTER PROGRAM PRODUCT

CROSS-REFERENCE TO RELATED APPLICATIONS

This application is a continuation of International Application No. PCT/CN2023/123450, filed on Oct. 8, 2023, which claims priority to Chinese Patent Application No. 202211397807.4, filed on Nov. 9, 2022, the entire contents of both of which are incorporated herein by reference.

FIELD OF THE TECHNOLOGY

Embodiments of this application relate to the field of machine learning technologies, and in particular, to a method and apparatus for training an image processing model, an electronic device, a computer-readable storage medium, and a computer program product.

BACKGROUND OF THE DISCLOSURE

In the related art, deep neural networks achieve very good performance in many computer vision tasks. Generally, a larger number of parameters and a larger calculation amount of a network indicates better performance of the network. However, it is very difficult to deploy such a large-scale network on an embedded system with limited resources, and performance of a network obtained by directly training a small-scale network is much lower than performance of the large-scale network. Therefore, in the related art, it is difficult to achieve optimal performance with a small calculation amount.

SUMMARY

In accordance with the disclosure, there is provided a model training method including obtaining a training sample set including a triplet training sample that includes a source image, a template image, and a true value image, performing face swapping on the source image and the template image through a first image processing model having a re-parameterization structure to obtain a face-swapped image, obtaining a second image processing model corresponding to the first image processing model and being a pre-trained image processing model, calculating a fusion loss function of the first image processing model according to the second image processing model, the first face-swapped image, and the true value image, training the first image processing model according to the fusion loss function, and determining a model parameter of the first image processing model in response to a training convergence condition of the first image processing model being reached.

Also in accordance with the disclosure, there is provided an electronic device including at least one memory storing one or more computer-executable instructions, and at least one processor configured to execute the one or more computer-executable instructions to obtain a training sample set including a triplet training sample that includes a source image, a template image, and a true value image, perform face swapping on the source image and the template image through a first image processing model having a re-parameterization structure to obtain a face-swapped image, obtain a second image processing model corresponding to the first image processing model and being a pre-trained image processing model, calculate a fusion loss function of the first image processing model according to the second image processing model, the first face-swapped image, and the true value image, train the first image processing model according to the fusion loss function, and determine a model parameter of the first image processing model in response to a training convergence condition of the first image processing model being reached.

Also in accordance with the disclosure, there is provided a non-transitory computer-readable storage medium storing one or more computer-executable instructions that, when executed by at least one processor, cause the at least one processor to obtain a training sample set including a triplet training sample that includes a source image, a template image, and a true value image, perform face swapping on the source image and the template image through a first image processing model having a re-parameterization structure to obtain a face-swapped image, obtain a second image processing model corresponding to the first image processing model and being a pre-trained image processing model, calculate a fusion loss function of the first image processing model according to the second image processing model, the first face-swapped image, and the true value image, train the first image processing model according to the fusion loss function, and determine a model parameter of the first image processing model in response to a training convergence condition of the first image processing model being reached.

DESCRIPTION OF EMBODIMENTS

Figures 1, 2:
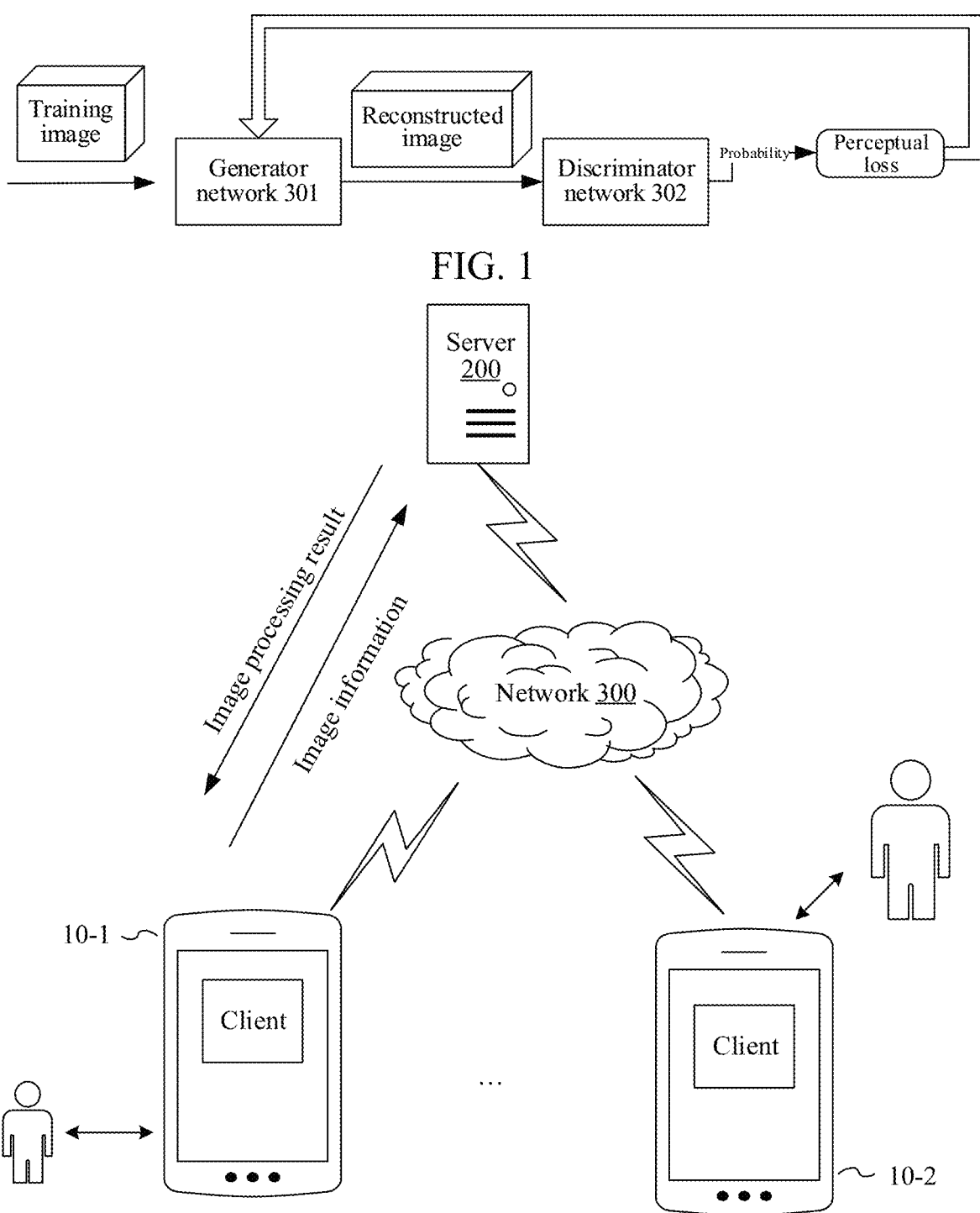
FIG. 1 is a schematic diagram showing a use environment of a method for training an image processing model according to an embodiment of this application.
FIG. 2 is a schematic diagram showing a composition structure of an apparatus for training an image processing model according to an embodiment of this application.

To make the objectives, technical solutions, and advantages of the embodiments of this application clearer, the following describes the embodiments of this application in further detail with reference to the accompanying drawings.

The described embodiments are not to be considered as a limitation to the embodiments of this application. All other embodiments obtained by a person of ordinary skill in the art without creative efforts shall fall within the protection scope of the embodiments of this application.

In the following description, the term "some embodiments" describes subsets of all possible embodiments, but "some embodiments" may be the same subset or different subsets of all the possible embodiments, and can be combined with each other without conflict.

In the following description, the terms "first/second/third" are merely intended to distinguish between similar objects rather than describe a specific order of the objects. "First/second/third" are interchanged in terms of a specific order or sequence if permitted, so that the embodiments in this application described herein can be implemented in an order other than the order illustrated or described herein.

Unless otherwise defined, meanings of all technical and scientific terms used in this specification are the same as those usually understood by a person skilled in the art to which this application belongs. The terms used in this specification are merely intended to describe the embodiments of this application, but are not intended to limit this application.

Before the embodiments of this application are further described in detail, nouns and terms involved in the embodiments of this application are described, and the nouns and terms involved in the embodiments of this application are applicable to the following explanations.

(1) Video face swapping: It refers to swapping an input source image onto a template face, and making a face in an output image keep information such as an expression, an angle, and background of the template face. Information other than the face in the output image is the same as that of the source image.

(2) Neural network: It is a mathematical model or a calculation model that mimics a structure and a function of a biological neural network in the fields of machine learning and cognitive science, and is configured to estimate or approximate a function.

(3) Model parameter: It is a quantity that uses a universal variable to establish a relationship between a function and a variable. In an artificial neural network, the model parameter is usually a real matrix.

(4) Knowledge transfer: In a deep neural network, knowledge transfer refers to assisting in training a student network with a fast speed but poor performance by using output data of training sample data at an intermediate network layer or a final network layer of a teacher network, so as to transfer a teacher network with good performance to the student network.

(5) Knowledge distill: In a deep neural network, knowledge distill refers to a technology of training a student network by using a smooth category posterior probability outputted by a teacher network in a classification problem.

(6) Teacher network: This is a high-performance neural network that provides more accurate supervisory information to a student network during knowledge transfer.

(7) Student network: This is a single neural network that has a fast calculation speed but poor performance and is suitable to be deployed in an actual application scenario with a high requirement on real-time performance. Compared with a teacher network, the student network has a greater operation throughput and fewer model parameters.

(8) Downsampling processing: Sampling is performed at intervals of several sample values in a sample value sequence, and an obtained new sequence is downsampling of an original sequence. For example, for an image I with a size of M*N, a low-resolution image with a size of (M/s)*(N/s) can be obtained by performing downsampling with a sampling rate of s on the image, where s is a common divisor of M and N.

(9) Generative adversarial network (GAN): This is a deep learning model. The model generates a better output through mutual game learning between at least two models: a generative model G and a discriminative model D, in a framework. For example, G is a model for making a high-resolution image (also referred to as a reconstructed image in this specification), and D is a model for detecting whether an image is an original natural image. A purpose of G is to make D unable to determine whether the high-resolution image generated by G is an unnatural image or not, and D needs to distinguish as much as possible whether an inputted image is an original natural image or an unnatural image generated by G. Parameters of G and D are continuously and iteratively updated until the generative adversarial network meets a convergence condition.

(10) Generator network: This is configured to generate a high-resolution image through a low-resolution image, and the generator may be a deep learning-based convolutional neural network.

(11) Discriminator network: This is configured to determine whether an inputted image x is an unnatural image generated by a generator or a natural image. The discriminator outputs a probability value $D1(x)$ ranging from 0 to 1. When $D1(x)$ is 0, it indicates that the image x inputted into the discriminator is a natural image; and when $D1(x)$ is 1, it indicates that the image x inputted into the discriminator is an unnatural image.

(12) Three-primary-color coding method: This is also referred to as an RGB color mode, and is a color standard in the industry. A variety of colors are obtained by changing three color channels of red (R), green (G), and blue (B) and imposing them on each other. RGB represents colors of three channels of red, green, and blue. This standard covers almost all colors that can be perceived by human vision and is one of the most widely used color systems.

(13) Face swapping: This refers to using a target part of an object in a to-be-processed image to replace a corresponding part of the target part of an object in another image.

FIG. 1 is a schematic diagram showing performing super-resolution processing on an image based on a super-resolution generative adversarial network in the related art. A structure of the super-resolution generative adversarial network is shown in FIG. 1, and includes a generator network 301 and a discriminator network 302. The generator network 301 and the discriminator network 302 are deep neural network models. A high-definition picture is used as a training sample image and downsampled, to form a low-resolution (compared with the high-definition picture) training sample image. A reconstructed image is generated by performing image reconstruction on the low-resolution training sample image through the generator network 301 in the super-resolution generative adversarial network. The discriminator network 302 in the super-resolution generative adversarial network discriminates the reconstructed image, and adjusts a parameter of the generator network 301 and/or a parameter of the discriminator network 302 according to a corresponding discrimination result until the generator network 301 and the discriminator network 302 can reach Nash equilibrium, so that training of the super-resolution generative adversarial network is completed. Therefore, the super-resolution generative adversarial network can reconstruct an inputted low-resolution image, to form a high-resolution image.

A problem existing in the foregoing solution in the related art includes: a model is required to have a very large number of parameters to generate a high-resolution image. For example, a Pix2PixHD model has approximately 100 million parameters. However, such a large-scale model has a disadvantage of a slow test speed, and it is difficult to deploy the large-scale model on a mobile device. Therefore, compression needs to be performed on the image processing model. In the related art, time consumption of a face-swapping model is often not considered. Performing training of the face-swapping model under supervision through a complex network structure leads to an excessively high computing complexity of the model and incapability of being run on a mobile device. For the problem that the model cannot be run on a mobile device due to a complex computing degree in the related art, the embodiments of this application provide a method and apparatus for training an image processing model, an electronic device, a computer-readable storage medium, and a computer program product. Ideas of structural re-parameterization and knowledge distillation can be introduced by cropping a model structure, so that floating point operations per second of the model are optimized to 544 million, which is reduced by 94% compared with 9373 million in the related art. After final deployment on a mobile phone, a quantity of picture transmission frames per second may range from 17 to 20, and time consumption basically meets a real-time performance requirement of the mobile device.

The method for training an image processing model provided in the embodiments of this application may be implemented by a terminal/server alone, or may be implemented by a terminal and a server in collaboration. For example, the terminal alone performs the following method for training an image processing model. Alternatively, the terminal sends a training request to the server, and the server performs the method for training an image processing model according to the received training request. The terminal sends an image processing request to the server, and the server generates an image processing result for a target to-be-processed image by invoking a generator network arranged in an image processing model, and returns the image processing result to the terminal.

The electronic device configured to perform the method for training an image processing model provided in the embodiments of this application may include various types of terminal devices or servers, where the server may be an independent physical server, or may be a server cluster including a plurality of physical servers or a distributed system, or may be a cloud server that provides basic cloud computing services; and the terminal may be a smartphone, a tablet computer, a notebook computer, a desktop computer, a smart speaker, and a smart watch, but is not limited thereto. The terminal and the server may be directly or indirectly connected in a wired or wireless communication manner. This is not limited in this application.

The server is used as an example. For example, the server may be a server cluster deployed in a cloud, to expose AI as a Service (AIaaS) to a user. An AIaaS platform splits several common AI services, and provides an independent or pack-aged service in the cloud. The service mode is similar to an AI theme mall. All users may access, through an application programming interface, to use one or more artificial intelligence services provided by the AIaaS platform.

FIG. 2 is a schematic diagram showing a use scenario of a method for training an image processing model according to an embodiment of this application. Referring to FIG. 2, an image processing software client is arranged on a terminal (including a terminal 10-1 and a terminal 10-2). The user may input a corresponding to-be-processed image through the arranged image processing software client, and the image processing client may also receive a corresponding image processing result and display the received image processing result to the user. The terminal is connected to a server 200 through a network 300, where the network 300 may be a wide area network or a local area network, or a combination thereof. Data transmission is implemented by using a radio link.

In some embodiments, the server 200 is configured to: set an image processing model and train the image processing model, to iteratively update a generator parameter and a discriminator parameter of the image processing model, so as to generate an image processing result for a target to-be-processed image through a generator network in the image processing model, and display, through the terminal (the terminal 10-1 and/or the terminal 10-2), an image processing result corresponding to the to-be-processed image generated by the image processing model. Certainly, before the target to-be-processed image is processed by the image processing model to generate the corresponding image processing result, the image processing model further needs to be trained. After a parameter of the image processing model is determined, the image processing model is deployed in a mobile terminal for the user to use, or may be saved in a cloud server network waiting for the user to download and use.

The method for training an image processing model provided in the embodiments of this application may be implemented based on artificial intelligence. The artificial intelligence (AI) involves a theory, a method, a technology, and an application system that use a digital computer or a machine controlled by the digital computer to simulate, extend, and expand human intelligence, perceive an environment, obtain knowledge, and use knowledge to obtain an optimal result. In other words, the AI is a comprehensive technology in computer science and attempts to understand the essence of intelligence and produce a new intelligent machine that can react in a manner similar to human intelligence. The AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. The AI software technologies mainly include several major directions such as a computer vision (CV) technology, a speech processing technology, a natural language processing technology, and machine learning/deep learning.

Figure 3:
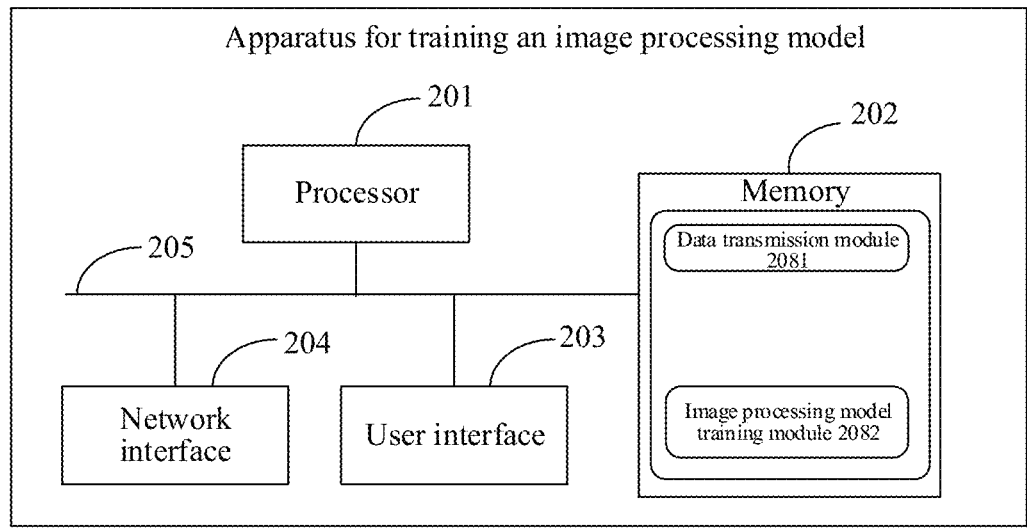
FIG. 3 is a schematic diagram showing generation of an image processing result.

A structure of the apparatus for training an image processing model provided in the embodiments of this application is described in detail below. The apparatus for training an image processing model may be implemented in various forms, such as a dedicated terminal having an image processing model training function, or a server provided with an image processing model training function, for example, the server 200 in FIG. 2. FIG. 3 is a schematic diagram showing a composition structure of an apparatus for training an image processing model according to an embodiment of this application. FIG. 3 shows only an exemplary structure rather than all structures of the apparatus for training an image processing model. A part or all of the structure shown in FIG. 3 may be shown as required.

The apparatus for training an image processing model provided in the embodiments of this application includes: at least one processor 201, a memory 202, a user interface 203, and at least one network interface 204. Components in an apparatus 20 for training an image processing model are coupled together by using a bus system 205. The bus system 205 is configured to implement connection and communication between the components. In addition to a data bus, the bus system 205 further includes a power bus, a control bus, and a state signal bus. However, for case of clear description, buses of various types in FIG. 3 are collectively labeled as the bus system 205.

The user interface 203 may include a display, a keyboard, a mouse, a track ball, a click wheel, a key, a button, a touch pad, a touchscreen, or the like.

The memory 202 may be a volatile memory or a non-volatile memory, or may include both a volatile memory and a non-volatile memory. The memory 202 in this embodiment of this application can store data to support operations of the terminal (such as the terminal 10-1). Examples of the data include any computer program to be operated on the terminal (such as the terminal 10-1), for example, an operating system and an application program. The operating system includes various system programs, for example, a frame layer, a kernel library layer, and a drive layer, configured for implementing various basic services and processing hardware-based tasks. The application program may include various application programs.

In some embodiments, the apparatus for training an image processing model provided in the embodiments of this application may be implemented by combining software and hardware. For example, the apparatus for training an image processing model provided in the embodiments of this application may be a processor in a form of a hardware decoding processor, which is programmed to perform the method for training an image processing model provided in the embodiments of this application. For example, the processor in the form of the hardware decoding processor may use one or more application specific integrated circuits (ASICs), a DSP, a programmable logic device (PLD), a complex programmable logic device (CPLD), a field-programmable gate array (FPGA), or other electronic elements.

As an example in which the apparatus for training an image processing model provided in the embodiments of this application is implemented by combining software and hardware, the apparatus for training an image processing model provided in the embodiments of this application may be directly implemented as a combination of software modules executed by the processor 201. Each software module may be located in a storage medium, and the storage medium is located in the memory 202. The processor 201 reads executable instructions included in the software module in the memory 202, and completes the method for training an image processing model provided in the embodiments of this application in combination of necessary hardware (for example, including the processor 201 and other components connected to the bus system 205).

As an example, the processor 201 may be an integrated circuit chip with a signal processing capability, for example, a general-purpose processor, a digital signal processor (DSP) or another programmable logic device, a discrete gate or a transistor logic device, or a discrete hardware component, where the general-purpose processor may be a microprocessor or any conventional processor.

As an example in which the apparatus for training an image processing model provided in the embodiments of this application is implemented by using hardware, the apparatus provided in the embodiments of this application may be executed and completed by directly using the processor 201 in the form of the hardware decoding processor. For example, the apparatus may be executed by using one or more application specific integrated circuits (ASICs), a DSP, a programmable logic device (PLD), a complex programmable logic device (CPLD), a field-programmable gate array (FPGA), or other electronic elements to implement the method for training an image processing model provided in the embodiments of this application.

The memory 202 in this embodiment of this application is configured to store various types of data to support operations of the apparatus 20 for training an image processing model. Examples of the data include any executable instruction operated on the apparatus 20 for training an image processing model, such as an executable instruction. A program implementing the method for training an image processing model in the embodiments of this application may be included in the executable instruction.

In some embodiments, the apparatus for training an image processing model provided in the embodiments of this application may be implemented by using software. FIG. 3 shows an apparatus 255 for training an image processing model and that is stored in the memory 250, which may be software in a form such as a program and a plugin, and include the following software modules: a data transmission module 2551 and an image processing model training module 2552. These modules are logical and may be combined in different manners or further split according to a function to be implemented. The following describes functions of the modules.

Figure 4:
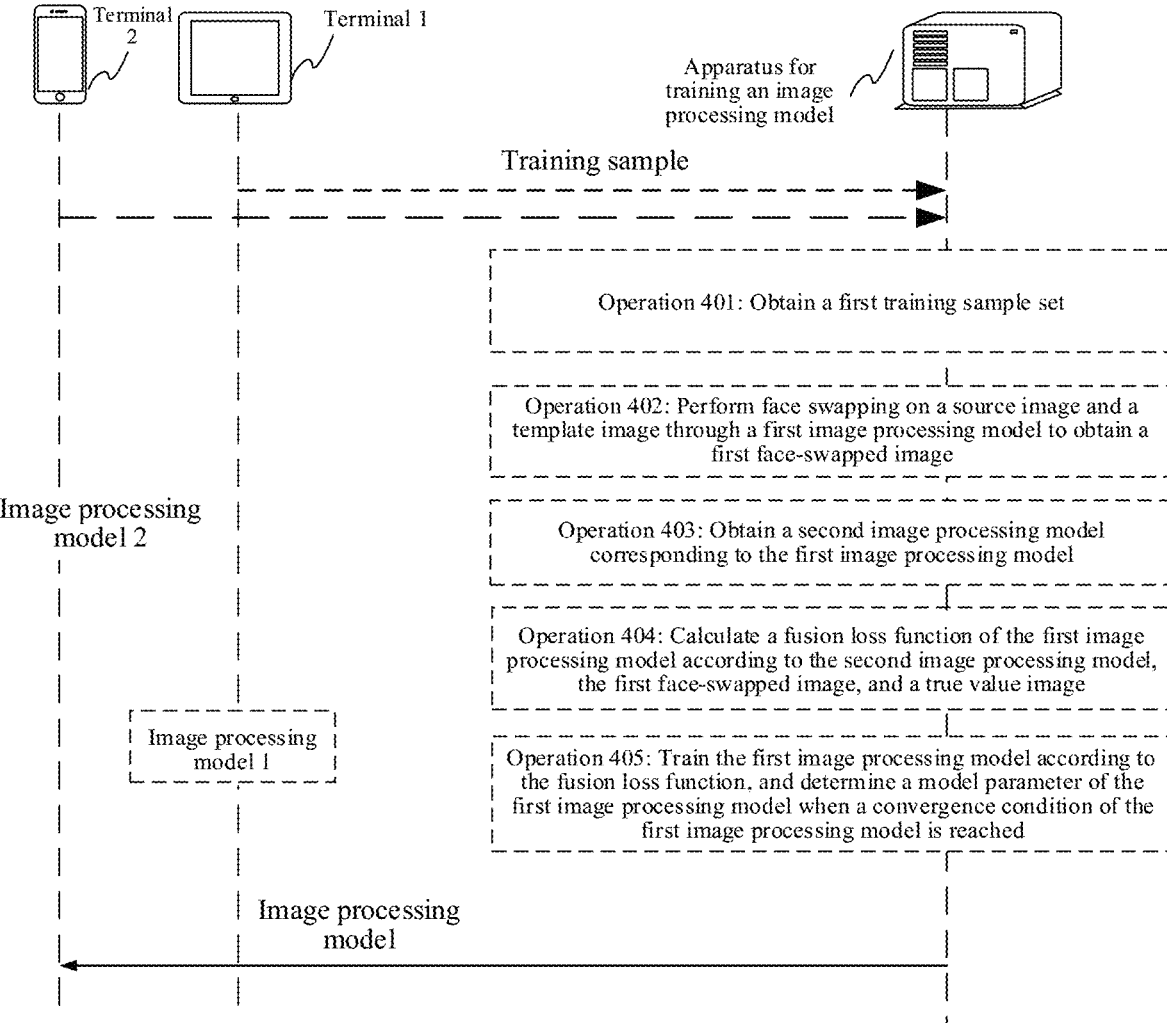
FIG. 4 is a schematic flowchart of a method for training an image processing model according to an embodiment of this application.

FIG. 4 is a schematic flowchart of a method for training an image processing model according to an embodiment of this application. The operations shown in FIG. 4 may be performed by various electronic devices running the apparatus for training an image processing model, for example, may be an applet running terminal having a face image detection and adjustment function, or a terminal having an image processing model training function. The following describes the operations shown in FIG. 4.

Operation 401: Obtain a first training sample set.

For example, the first training sample set includes at least one triplet training sample, where the triplet training sample includes: a source image, a template image, and a true value image. A face image in an environment in which a mobile terminal is located may be collected as the source image. The source image herein may be an image A including an object A, the template image may be an image B including an object B, and the true value image may be an image in which a face of the object B in the image B is replaced with a face of the object A.

Figure 5:
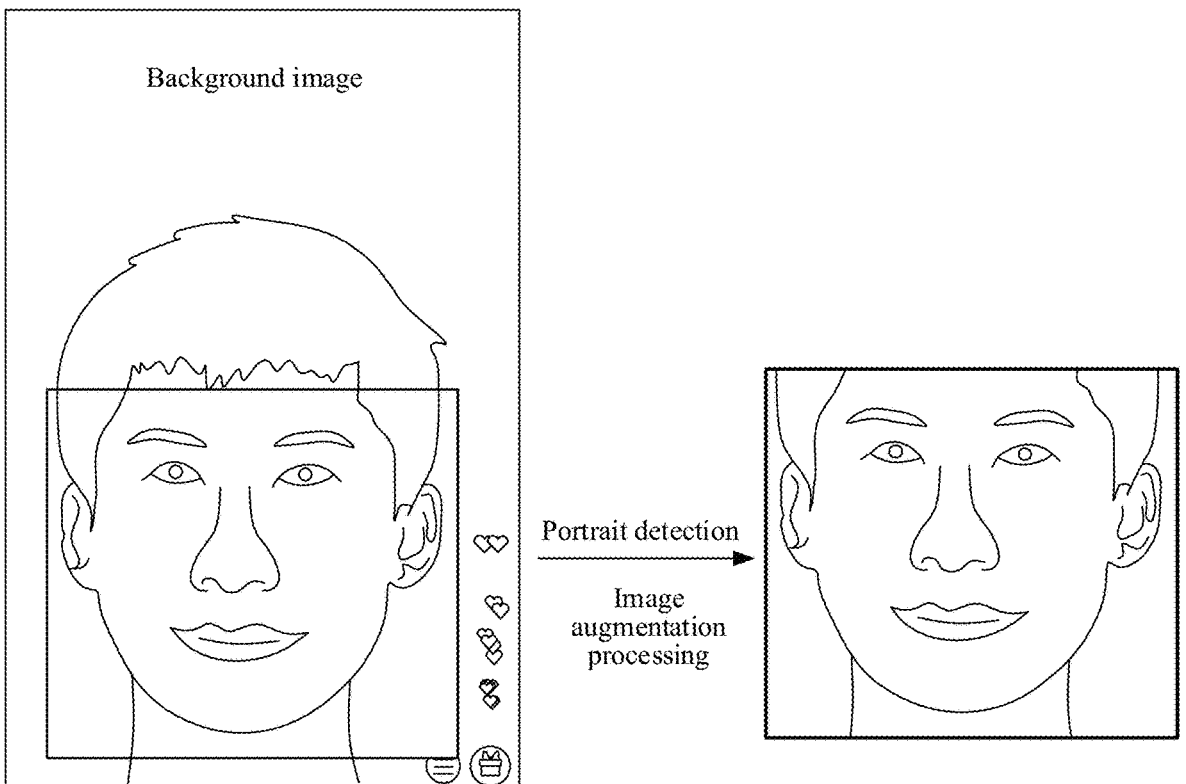
FIG. 5 is a schematic diagram showing a facial image collecting process according to an embodiment of this application.

FIG. 5 is a schematic diagram showing a facial image collecting process according to an embodiment of this application. When light in a photographing environment of an image collection device is dark, dark channel defogging processing may be performed on the facial image, to form an augmented image, where the formed augmented image may include a face feature and/or a limb feature.

A process of the dark channel defogging processing is as follows: determining a dark channel value of the facial image, a grayscale value of the facial image, and a defogging adjustment value; determining an airlight value of the facial image based on the dark channel value, the defogging adjustment value, and the grayscale value of the facial image; and performing processing on the facial image according to the airlight value and a light adjustment value of the facial image, to form the augmented image.

The dark channel is obtained by taking a minimum value of three RGB channels of the obtained facial image to form a grayscale image during collection of the facial image and performing minimum value filtering on the grayscale image formed by the minimum value. The defogging adjustment value may be obtained by analyzing an image parameter of the facial image collected by the mobile terminal; and the grayscale value and the dark channel value of the facial image may be obtained after the collected facial image is converted into a grayscale image.

The dark channel value is denoted as Dark_channel, grayscale values of the facial image are denoted as Mean_H and Mean_V, the airlight value of the facial image is denoted as AirLight, the defogging adjustment value is denoted as P, the light adjustment value is denoted as A, a to-be-augmented facial image is denoted as Input, and a result obtained by calculating an additive inverse of the to-be-augmented facial image is denoted as IR. For any input image, M % pixel points with a largest grayscale value of a dark channel image of the input image are taken, and an average value of the M % pixel points corresponding to a grayscale value of each channel is determined, where M ranges from 0.1 to 0.3, so that an airlight value of each channel is calculated, that is, the airlight value AirLight is a three-element vector, and each element corresponds to one color channel.

In some embodiments, when the facial image is collected, a minimum value of each pixel point of the facial image in the three channels may be determined. A minimum value of each pixel point of a defogged image in the three channels is assigned to a corresponding pixel point in the dark channel image. The dark channel value of the facial image may be determined through a formula: Dark_channel=min (Input_R, Input_G, Input_B), where Input_R is a value of an R channel of the to-be-augmented facial image, Input_G is a value of a G channel of the to-be-augmented facial image, and Input_B is a value of a B channel of the to-be-augmented facial image. The collected facial image is adjusted through the airlight value and light adjustment value, to obtain a clearer facial image collection result.

In some embodiments, when a face image is collected, a face image collected by a terminal in a use environment of a first image processing model may be obtained through a mobile terminal; image augmentation processing is performed on the face image; based on a result of the image augmentation processing, a corresponding face position is determined through a face detection algorithm, and a face image including a background image is intercepted based on the face position; and the face image including the background image is cropped to obtain the source image.

For example, the face detection algorithm may be an algorithm configured for detecting a face position in an image, such as a deep learning-based face detection and face alignment method.

Figure 6:
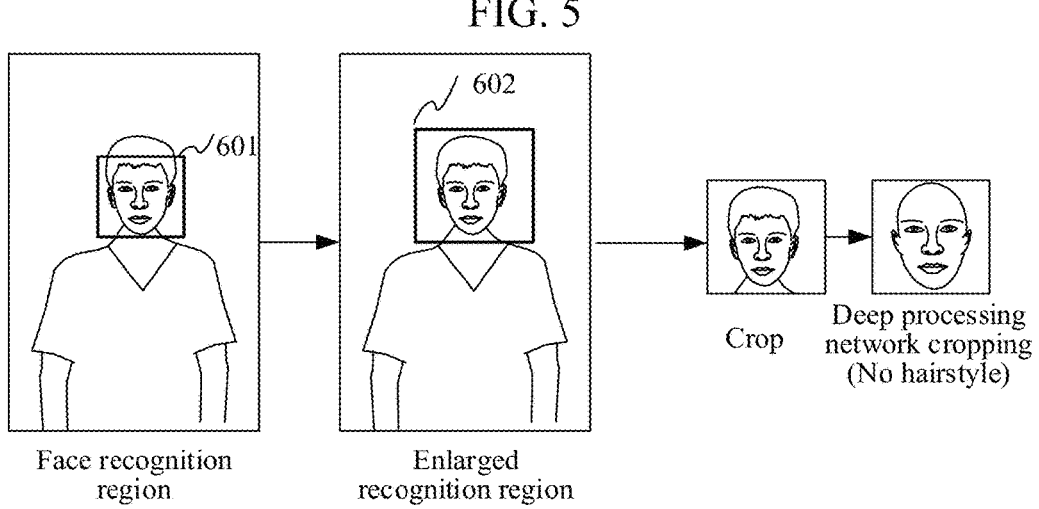
FIG. 6 is a schematic diagram showing a facial image collecting process according to an embodiment of this application.

FIG. 6 is a schematic diagram showing a facial image collecting process according to an embodiment of this application. Since a position of an image collection device is fixed, due to different heights of target objects, comprehensiveness of collected face images differs (a defect that an accurate face image cannot be collected since a target object is too short or too tall may occur). To obtain a more comprehensive face image, image augmentation processing may be performed on a collected face image; based on a result of the image augmentation processing, a corresponding face position is determined through a face detection algorithm, and a face image including a background image is intercepted; and background clearing processing is performed on the face image including the background image, to form a face image of a corresponding target user. After a user image collected by a payment electronic device is obtained, a region in which a user face is located may be first framed through a face detection technology, and the user image is expanded by two times with the region as a center. As shown in FIG. 6, a detection region of a detection box 601 is adjusted to a detection region of a detection box 602, to obtain more background content, and cropping is performed on a facial image including the background content. For example, the following manner may be used: framing a face position of a target object through the face detection algorithm; marking feature points of a face, such as human eyes, a mouth, and a nose by using a facial feature positioning algorithm; and intercepting the facial image including the background content according to the detected face position.

After obtaining a face image including a background image, a pre-trained deep processing network may be triggered, where the deep processing network may include but is not limited to: LeNet, AlexNet, VGG, an Inception series network, and a ResNet network. By extracting a feature of the face image (for example, extracting a feature such as a mean or a variance based on a grayscale and a distribution histogram, a feature such as GLCM and GLRLM based on a correlation matrix, or a signal feature based on image Fourier transform) and performing background clearing processing based on the extracted feature, a depth map corresponding a face calculated through a real human face cropped through the deep processing network is obtained.

In some embodiments, a facial image obtained by calculating the real human face includes the depth map, while a depth map obtained by using an attack picture (such as a face picture) is a black base image. A face image of the target object may be obtained by restoring the depth map. The obtained face image of the target object does not include the background image, so that a processing result of a face swapping function of the image processing model is more accurate.

Operation 402: Perform processing on the first training sample set through a first image processing model to obtain a first face-swapped image, where the first image processing model is of a re-parameterization structure.

For example, the re-parameterization structure refers to that the first image processing model is obtained based a structural re-parameterization technology, where structural re-parameterization refers to first constructing a series of structures (generally configured for training), and equivalently converting parameters of the structures into another set of parameters (generally configured for inference), to equivalently convert the series of structures into another series of structures. During training, the structure is large and has a good property (higher precision or another useful property, such as sparsity). A structure obtained through conversion during inference is small and retains this property (same precision or another useful property). The term "structural re-parameterization" means to convert a set of parameters of a structure into another set of parameters, and parameterize another structure by using the parameters obtained through conversion. Replacement between the two structures is equivalent as long as the conversion of the parameters is equivalent.

In some embodiments, noise may occur in a face image collected from an environment of a mobile terminal. Therefore, before training of the image processing model is performed by using the first training sample set, denoising may be performed on the first training sample set, to save training time of the first image processing model and improve training precision of the first image processing model. Specifically, a use environment of a trained first image processing model includes: a film production scenario, a game image production scenario, a live streaming virtual image production scenario, and a certificate photo production scenario.

During film production, some professional action shots are completed by a professional person, and an actor may be automatically replaced through a face-swapped image in a later stage. Specifically, an image frame including the professional person in an action shot video clip may be obtained, an image including a replacement actor is used as the source image, each image frame including the professional person is used as the template image, and the template image is inputted into the trained first image processing model together with the source image, to output a corresponding face-swapped image In the outputted face-swapped image, an identity of the professional person in the template image is replaced with an identity of the replacement actor. By using the face-swapped image, the film production is more convenient, repeated photographing is avoided, and costs of the film production are saved.

During game image production, an image including a character object may be used as the source image, and an image including a game image may be used as the template image. The source image and the template image are inputted into the trained first image processing model, to output a corresponding face-swapped image. In the outputted face-swapped image, an identity of the game image in the template image is replaced with an identity of the character object in the source image. By using the face-swapped image, an exclusive game image can be designed for a character.

In a live streaming scenario, an image including a virtual image may be used as the source image, each image frame including a character object in live streaming is used as the template image, and the template image is inputted into the trained first image processing model together with the source image, to output a corresponding face-swapped image. In the outputted face-swapped image, an identity of the character object in the template image is replaced with the virtual image. Identity replacement may be performed in the live streaming scenario by using the virtual image, to improve interestingness of the live streaming scenario.

In a certificate photo production process, an image of an object that needs to produce a certificate photo is used as the source image, and the source image and a certificate photo template image are inputted into the trained first image processing model, to output a corresponding face-swapped image. In the outputted face-swapped image, an identity of a template object in the certificate photo template image is replaced with the object that needs to produce the certificate photo. By using the face-swapped image, the object that needs to make a certificate photo can directly produce the certificate photo by providing an image without photographing, which greatly reduces production costs of the certificate photo.

In the above four scenarios, since noise in the film production and the game image production scenarios is not fixed, a dynamic noise threshold matching the use environment of the first image processing model may be determined; and denoising processing is performed on the first training sample set according to the dynamic noise threshold, to form a second training sample set matching the dynamic noise threshold, so as to ensure the training precision of the image processing model.

For the live streaming virtual image production and the certificate photo production scenarios, since the noise is not fixed, a fixed noise threshold corresponding to a second image processing model is determined, and denoising processing is performed on the first training sample set according to the fixed noise threshold, to form a second training sample set matching the fixed noise threshold, so that training time of the image processing model can be further compressed.

Operation 403: Obtain a second image processing model corresponding to the first image processing model, where the second image processing model is a pre-trained image processing model, and a model parameter of the second image processing model remains unchanged in a subsequent training process.

In some embodiments, the second image processing model may be a trained neural network, and the second image processing model may be a neural network with a large scale. For example, a quantity of network parameters of the second image processing model is greater than a specific value, but this is not limited in the embodiments of this application. The second image processing model may be a convolutional neural network (CNN), a deep neural network (DNN), a recurrent neural network (RNN), or the like. A type of the second image processing model is not limited in the embodiments of this application. The second image processing model may be a neural network suitable for different computer vision tasks, for example, a target recognition task, a target classification task, a target detection task, or a pose estimation task. The second image processing model may alternatively be a neural network suitable for different application scenarios, for example, a security detection scenario, a face unlocking scenario, a smart driving scenario, or a remote sensing scenario. An application range of the second image processing model is not limited in the embodiments of this application. A network structure of the second image processing model may be designed according to a computer vision task, or a network structure of the second image processing model may use at least part of an existing network structure, for example, a deep residual network or a visual geometry group network (VGG-Net).

The first image processing model may be a to-be-trained neural network, and the first image processing model may be a small-scale neural network, so as to be deployed in a mobile terminal through an advantage of low floating point operations. For example, a quantity of network parameters of the first image processing model is less than a specific value (the quantity of network parameters of the first image processing model is at least less than the quantity of network parameters of the second image processing model), but this is not limited in the embodiments of this application. A network scale of the second image processing model is greater than a network scale of the first image processing model, where the second image processing model may be a teacher network, and the first image processing model may be a student network. Training the student network by using the teacher network can improve performance of a student network obtained through the training. In some embodiments, the first image processing model may be trained through knowledge distillation or another method. This is not limited in the embodiments of this application.

Figure 7:
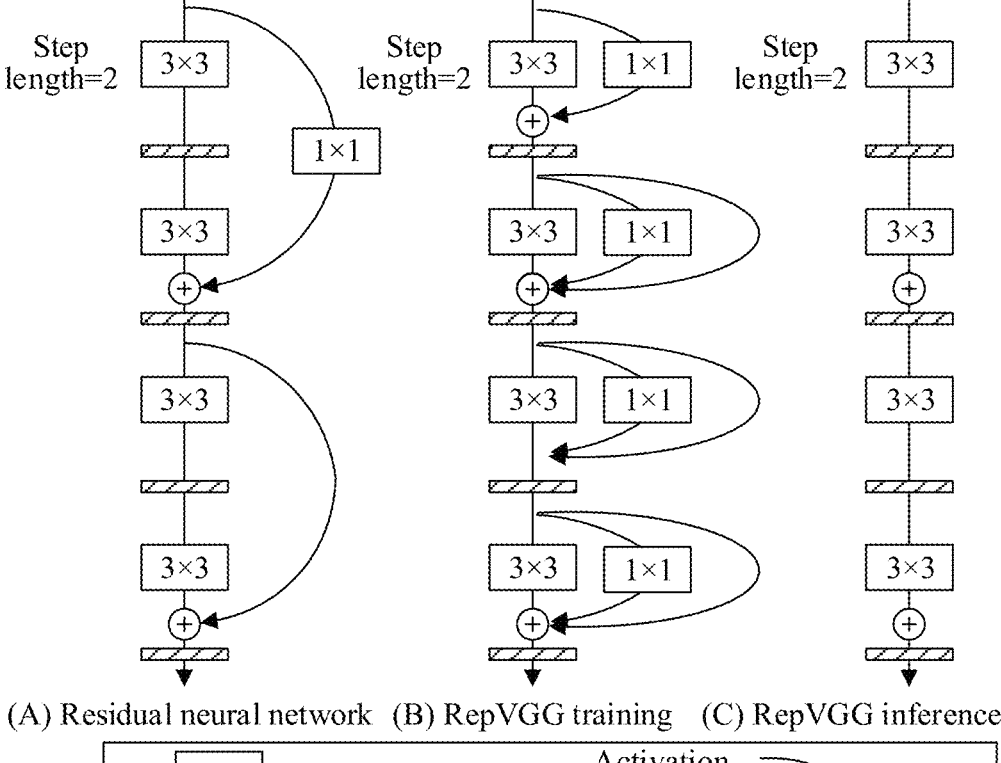
FIG. 7 is a schematic diagram showing a model structure of a first image processing model according to an embodiment of this application.

FIG. 7 is a schematic diagram showing a model structure of a first image processing model according to an embodiment of this application. Structures of an encoder and a decoder in a model of the first image processing model are a re-parameterization structure visual geometry group (RepVGG). As shown in FIG. 7, A in FIG. 7 represents an original ResNet network, where the network includes a residual structure of Conv1*1 and a residual structure of Identity. Existence of these residual structures resolves a gradient disappearance problem in a deep network, making the network easier to converge. B in FIG. 7 represents a RepVGG network architecture in a training stage. A body of an entire network includes a residual structure. In addition, a residual block in the RepVGG network does not cross a layer, and the entire network includes two residual structures. Since the residual structure has a plurality of branches, it is equivalent to adding a plurality of gradient flow paths to the network. The first image processing model uses the structure shown in FIG. 7. This is actually similar to training a plurality of networks and fusing the plurality of networks into one network, which has higher training efficiency. C in FIG. 7 represents the RepVGG network in a test stage. A structure of the network is very simple. An entire network is formed by connecting the following network Conv3*3 plus an Relu, which is easy to test and accelerate the model.

Figure 8:
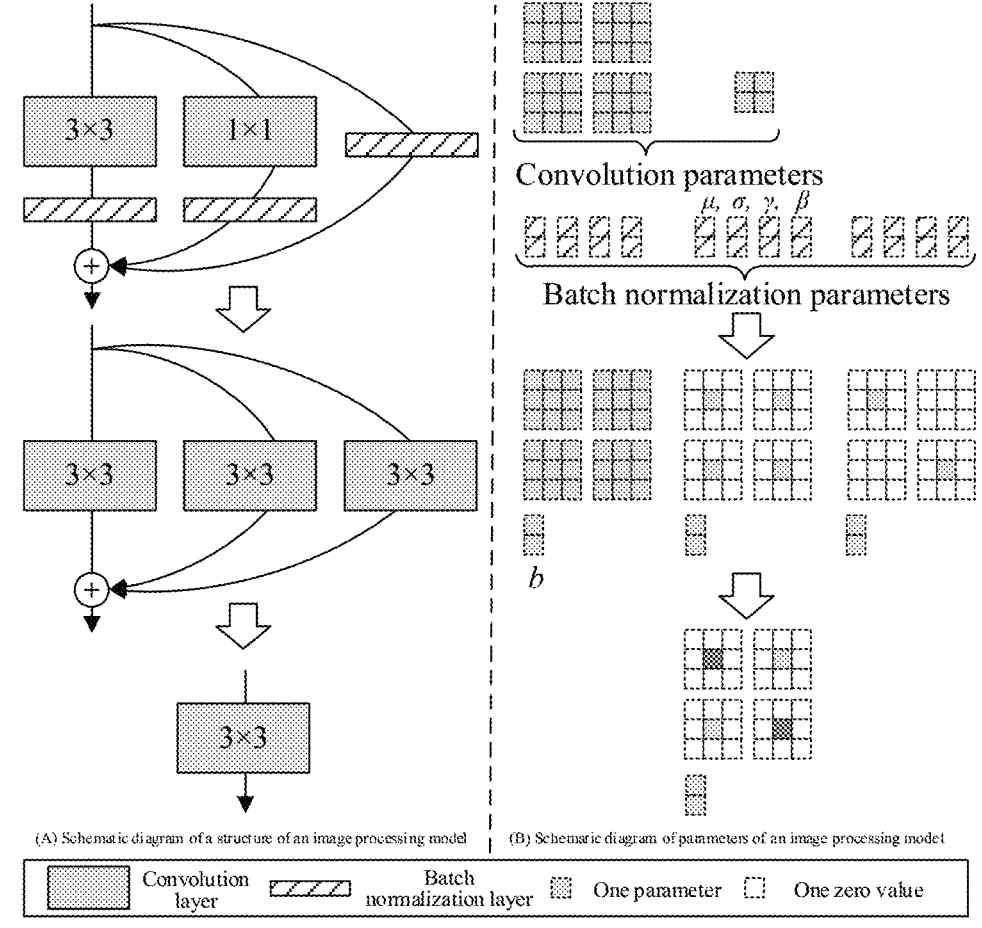
FIG. 8 is a schematic diagram showing a test process of a first image processing model according to an embodiment of this application.

FIG. 8 is a schematic diagram showing a test process of a first image processing model according to an embodiment of this application. Currently, test engines in most mobile devices perform specific acceleration on Conv3*3. If each Conv3*3 in the entire network can save 3 ms, and if one network includes 30 convolution layers, an entire network can save 3*30=90 ms. For a residual node, a final result can only be obtained after corresponding results of all residual branches are calculated, and intermediate results of these residual branches are stored in an internal memory of the device. This requires the mobile terminal to have a large internal memory, and back and forth internal memory operations reduce a test speed of the entire network. In the test stage, the model is first converted into a single branch structure offline. In the test stage of the mobile terminal, a utilization rate of the internal memory of the device can be better improved, thereby improving a test speed of the model.

Operation 404: Calculate a fusion loss function of the first image processing model according to the second image processing model and the first face-swapped image.

In some embodiments, the fusion loss function of the first image processing model is a combination of different loss functions. A second face-swapped image outputted by the second image processing model is obtained, and a reconstruction loss function of the first image processing model is calculated by using the first face-swapped image and the second face-swapped image. A feature loss function of the first image processing model is calculated based on the first face-swapped image and the second face-swapped image. An estimation loss function of the first image processing model is calculated based on the first face-swapped image and the source image. An adversarial loss function of the first image processing model is calculated based on the first face-swapped image and the true value image. A sum of the reconstruction loss function, the feature loss function, the estimation loss function, and the adversarial loss function is calculated to obtain the fusion loss function of the first image processing model. Through the embodiments of this application, a training effect of the first image processing model can be improved from a plurality of dimensions, thereby improving face swapping accuracy of the first image processing model.

Specifically, for calculation of the fusion loss function loss, referring to formula (1):

$$loss = Reconstruction\_loss + LPIPS\_loss + ID\_loss + D\_loss + G\_loss \quad (1)$$

Reconstruction_loss is the reconstruction loss function, LPIPS_loss is the feature loss function, ID_loss is the estimation loss function, D_loss is a discriminator loss; and G_loss is a generator loss, where (D_loss+G_loss) forms the adversarial loss function.

A loss function of each dimension in the formula (1) is introduced below:

(1) For the second image processing model (BigModel) serving as the teacher network, the second face-swapped imaged calculated by the second image processing model may be represented as BigModel_fake, and the first face-swapped image calculated by the first image processing model may be represented as fake. Through the embodiments of this application, a training effect of the second image processing model may be transferred to the first image processing model, thereby playing a teaching role.

For calculation of the reconstruction loss function Reconstruction_loss, referring to formula (2):

$$BigModel\_fake = BigModel\_swap \ (source, template) \quad (2)$$

$$Reconstruction\_loss = |BigModel\_fake - fake|;$$

BigModel_fake is the second face-swapped image, BigModel_swap represents a forward processing process of the second image processing model, source is the source image, template is the template image, Reconstruction_loss is the reconstruction loss function, and fake is the first face-swapped image.

A smaller pixel-level difference between fake and BigModel_fake indicates a better teaching effect of the second image processing model on training of the first image processing model, so that the first image processing model inherits precision of the second image processing model.

(2) Calculation of the feature loss function: Feature extraction is performed on the first face-swapped image through a pre-trained feature extraction network, to obtain features of a plurality of levels of the first face-swapped image; feature extraction is performed on the second face-swapped image through the pre-trained feature extraction network, to obtain features of a plurality of levels of the second face-swapped image; and the feature loss function of the first image processing model is determined based on a difference between the features of the plurality of levels of the first face-swapped image and the features of the plurality of levels of the second face-swapped image Through the embodiments of this application, an extraction capability of the first image processing model for immediate features can be ensured, thereby improving the face swapping accuracy of the first image processing model.

For calculation of the feature loss function, referring to formula (3):

$$LPIPS\_loss = \quad (3)$$
$$|result\_fea1 - gt\_img\_fea1| + |result\_fea2 - gt\_img\_fea2| +$$
$$|result\_fea3 - gt\_img\_fea3| + |result\_fea4 - gt\_img\_fea4|;$$

In the foregoing formula (3), (result_fea1, result_fea2, result_fea3, result_fea4)=alexnet_feature (fake); and (gt_img_fea1, gt_img_fea2, gt_img_fea3, gt_img_fea4)= alexnet_feature (BigModel_fake), where a feature extraction network Alexnet is formed by five convolution layers, three pooling layers, and three fully connected layers. In an output result of the feature extraction network Alexnet, alexnet_feature (fake) represents inputting the first face-swapped image (fake) into an alexnet network model and outputting features outputted by fake at four feature extraction layers (respectively corresponding to different layers) of the alexnet network model, where result_fea1, result_fea2, result_fea3, and result_fea4 are respectively decoded face feature of the first face-swapped image outputted by each of the four feature extraction layers. alexnet_feature (gt_img) represents inputting the second face-swapped image gt_img into the alexnet network model and outputting features outputted by gt_img at the four feature extraction layers (respectively corresponding to different layers) of the alexnet network model, where gt_img_fea1, gt_img_fea2, gt_img_fea3, and gt_img_fea4 are respectively standard face feature of the second face-swapped image gt_img outputted by each of the four feature extraction layers.

(3) Calculation of the estimation loss function: a first face-swapped image feature vector fake_id_features of the first face-swapped image is extracted; a source image feature vector socre_id_features of the source image is extracted; and the estimation loss function of the first image processing model is calculated by using a similarity between the first face-swapped image feature vector and the source image feature vector. Through the embodiments of this application, it can be ensured that no distortion occurs in a face swapping process performed by the first image processing model, thereby improving the face swapping accuracy of the first image processing model.

Referring to formula (4):

$$ID\_loss = 1 - cosine\_similarity \ (fake\_id\_features, socre\_id\_features); \quad (4)$$

ID_loss is the estimation loss function, fake_id_features is the first face-swapped image feature vector, socre_id_features is the source image feature vector, and cosine_similarity is a cosine similarity.

(4) Calculation of the adversarial loss function: The generator network may be referred to as G. The discriminator network may be referred to as D, and is configured to distinguish whether an inputted picture is generated by the generator network or not. A high-resolution image x is inputted, and a number D (x) ranging from 0 to 1 is outputted. D (x) is configured for determining whether the inputted picture is generated by the generator or not, where 0 represents no, and 1 represents yes. D_loss is the discriminator loss, G_loss is the generator loss, and (D_loss+G_loss) forms the adversarial loss function loss. For calculation of the adversarial loss function, referring to formula (5):

$$\begin{cases} D\_loss = -\log D(gt\_img) - \log(1 - D(fake)) & (5) \\ G\_loss = \log(1 - D(fake)) \\ loss = D\_loss + G\_loss \end{cases}$$

D_loss is the discriminator loss, G_loss is the generator loss, D(gt_img) is a discrimination result outputted by the discriminator for the true value image, D(fake) is a discrimination result outputted by the discriminator for the first face-swapped image, and loss is the adversarial loss function. The discrimination result may be a probability, that is, a probability of belonging to a real image.

Operation 405: Train the first image processing model according to the fusion loss function, and determine a model parameter of the first image processing model when a training convergence condition of the first image processing model is reached.

For example, the training convergence condition herein may be that a set quantity of training times is reached, or may be that the fusion loss function converges to a minimum value.

So far, training of the first image processing model is completed through Operation 401 to Operation 405, the parameter of the first image processing model is determined, and the trained first image processing model can be deployed in a mobile terminal to perform a face swapping function. In this case, floating point operations FLOPs of the first image processing model are optimized to 544 million, which is reduced by 94% compared to the FLOPs of 9373 million of the second image processing model. After final deployment on a mobile phone, a quantity of picture transmission frames per second may range from 17 to 20, so that time consumption of the face swapping function meets a real-time performance requirement of the mobile terminal.

Figures 9, 10:
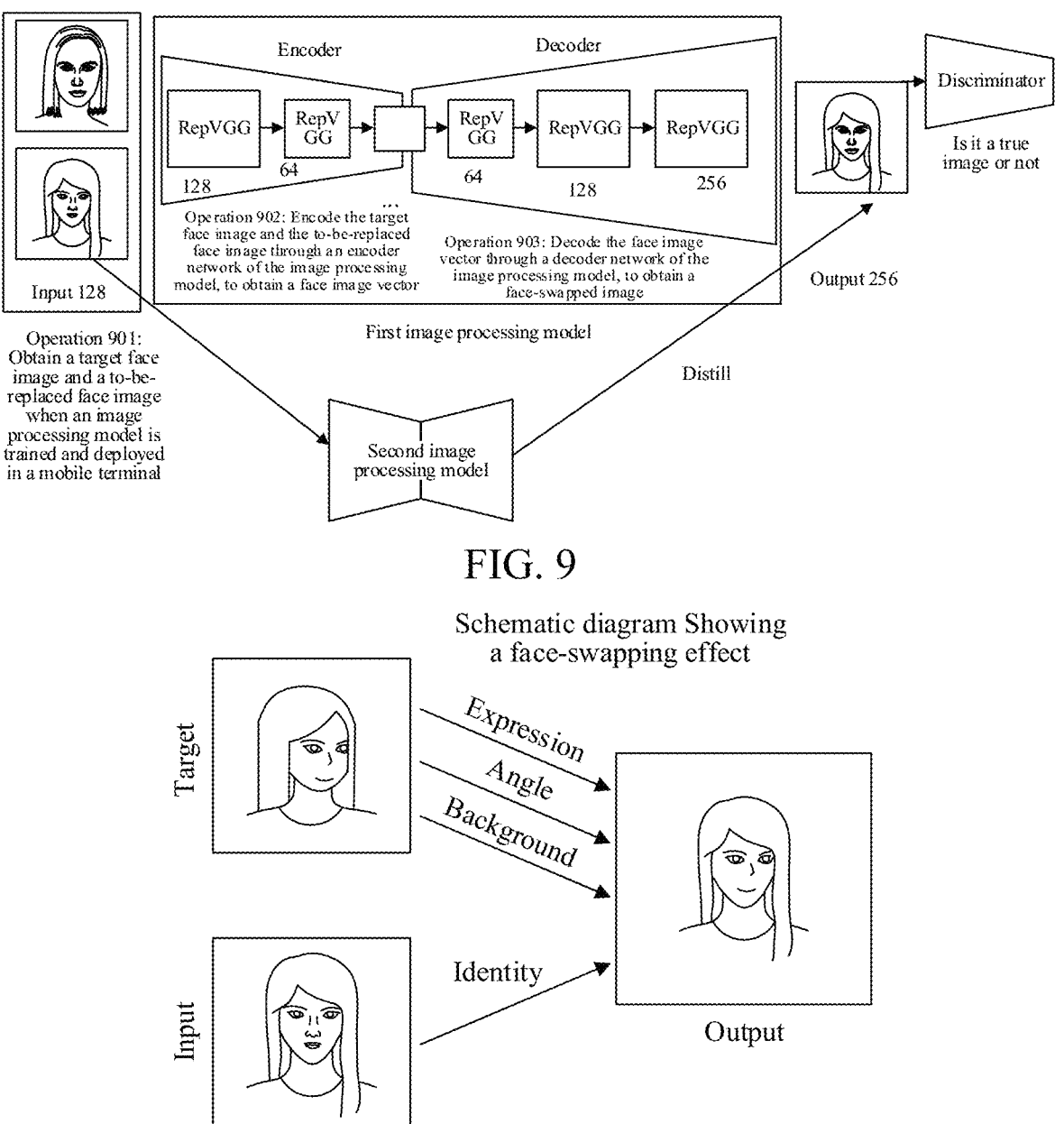
FIG. 9 is a schematic diagram showing a working process of a trained image processing model according to an embodiment of this application.
FIG. 10 is a schematic diagram showing a face-swapping effect according to an embodiment of this application.

To better describe a working process of the image processing model provided in this application, FIG. 9 is a schematic diagram showing a working process of a trained image processing model according to an embodiment of this application, specifically including the following operations:

Operation 901: Obtain a target face image (corresponding to a source image) and a to-be-replaced face image (also referred to as a "candidate face image," corresponding to a template image) when an image processing model is trained and deployed in a mobile terminal.

Operation 902: Encode the target face image and the to-be-replaced face image through an encoder network of the image processing model, to obtain a face image vector.

Operation 903: Decode the face image vector through a decoder network of the image processing model, to obtain a face-swapped image.

As shown in FIG. 9, the generator uses asymmetric input and output. Since a screen of the mobile terminal is small, a decoder downgrades a network output resolution from 512 pixels to 256 pixels, and designs an input resolution to 128 pixels, to meet use of the mobile terminal.

The encoder network continuously halves the input through convolution calculation, and increases a quantity of channels gradually. Specifically, input is gradually encoded from 128*128*6 (the target face image and the to-be-replaced face image, and a quantity of RGB channels in each image is 3) to 64*64*32, 32*32*64, 16*16*128, and so on.

The decoder network gradually multiplies the resolution through deconvolution calculation, and decodes the input into 32*32*64, 64*64*32, 128*128*16, and 256*256*3. Finally, a face-swapped result is obtained.

FIG. 10 is a schematic diagram showing a face-swapping effect according to an embodiment of this application. A target source facial image may be, for example, a face image (a) in FIG. 10, a target template facial image may be, for example, a face image (b) in FIG. 10, and a facial swapped image may be, for example, a face image (c) in FIG. 10. The face image (c) is obtained by replacing a face in the face image (a) with a face in the face image (b). It can be seen from the face image (c) that an identity and an additional image of the face image (c) is consistent with an identity and an additional image of the face image (b), that is, the face image (c) and the face image (b) are a face of a same person, and the face image (c) includes a same pair of glasses as the face image (b). The face image (c) has a same attribute as the face image (a). For example, it can be seen from the face image (c) that the face image (c) has the same hairstyle as the face image (a), and a mouth opening angle of the face image (c) is larger than a mouth opening angle of the face image (b), thereby matching a mouth opening angle of the face image (a), and achieving a face-swapping processing effect required by a user.

In the embodiments of this application, relevant data such as user information, a character image, or the like is involved. When the embodiments of this application are applied to specific products or technologies, user permission or consent is required, and collection, use, and processing of relevant data need to comply with relevant laws, regulations, and standards of relevant countries and regions.

The following continues to describe an exemplary structure of an apparatus for training an image processing model being implemented as a software module according to an embodiment of this application. In some embodiments, as shown in FIG. 2, software modules stored in the apparatus for training the image processing model of a memory may include: a data transmission module 2081, configured to obtain a first training sample set, where the first training sample set includes at least one triplet training sample, and the triplet training sample includes: a source image, a template image, and a true value image; an image processing model training module 2082, configured to perform face swapping on the source image and the template image through a first image processing model to obtain a first face-swapped image, where the first image processing model is of a re-parameterization structure; the image processing model training module 2082, configured to obtain a second image processing model corresponding to the first image processing model, where the second image processing model is a pre-trained image processing model; the image processing model training module 2082, configured to calculate a fusion loss function of the first image processing model according to the second image processing model, the first face-swapped image, and the true value image; and the image processing model training module 2082, configured to train the first image processing model according to the fusion loss function, and determine a model parameter of the first image processing model when a training convergence condition of the first image processing model is reached.

In some embodiment, the image processing model training module 2082 is further configured to: determine a dynamic noise threshold matching a use environment of the first image processing model; and perform denoising processing on the first training sample set according to the dynamic noise threshold, to form a second training sample set matching the dynamic noise threshold; or determine a fixed noise threshold corresponding to the second image processing model, and perform denoising processing on the first training sample set according to the fixed noise threshold, to form a second training sample set matching the fixed noise threshold.

In some embodiments, the image processing model training module 2082 is further configured to: obtain a face image collected by a terminal in a use environment of the first image processing model; perform image augmentation processing on the face image; determine a corresponding face position based on a processing result of the image augmentation, and intercepting a face image including a background image based on the face position; and crop the face image including the background image, to obtain the source image.

In some embodiments, the image processing model training module 2082 is further configured to: obtain a second face-swapped image outputted by the second image processing model, and calculate a reconstruction loss function of the first image processing model by using the first face-swapped image and the second face-swapped image; calculate a feature loss function of the first image processing model based on the first face-swapped image and the second face-swapped image; calculate an estimation loss function of the first image processing model based on the first face-swapped image and the source image; calculate an adversarial loss function of the first image processing model based on the first face-swapped image and the true value image; and perform fusion processing on the reconstruction loss function, the feature loss function, the estimation loss function, and the adversarial loss function, to obtain the fusion loss function of the first image processing model.

In some embodiments, the image processing model training module 2082 is further configured to: calculate a pixel-level difference between the first face-swapped image and the second face-swapped image; and determine the reconstruction loss function of the first image processing model according to the pixel-level difference.

In some embodiments, the image processing model training module 2082 is further configured to: perform feature extraction on the first face-swapped image through a pre-trained feature extraction network, to obtain features of a plurality of levels of the first face-swapped image; perform feature extraction on the second face-swapped image through the pre-trained feature extraction network, to obtain features of a plurality of levels of the second face-swapped image; and determine the feature loss function of the first image processing model based on a difference between the features of the plurality of levels of the first face-swapped image and the features of the plurality of levels of the second face-swapped image.

In some embodiments, the image processing model training module 2082 is further configured to: extract a first face-swapped image feature vector of the first face-swapped image; extract a source image feature vector of the source image; and calculate the estimation loss function of the first image processing model by using a similarity between the first face-swapped image feature vector and the source image feature vector.

In some embodiments, the image processing model training module 2082 is further configured to: obtain a target face image and a to-be-replaced face image when the first image processing model is trained and deployed in a mobile terminal; encode the target face image and the to-be-replaced face image through an encoder network of the first image processing model, to obtain a face image vector; and decode the face image vector through a decoder network of the first image processing model, to obtain a third face-swapped image.

An embodiment of this application provides a computer program product, where the computer program product includes a computer program or computer-executable instructions, and the computer-executable instructions are stored in a computer-readable storage medium. A processor of an electronic device reads the computer-executable instructions from the computer-readable storage medium, and the processor executes the computer-executable instructions, to cause the electronic device to perform the method for training an image processing model according to the embodiments of this application.

An embodiment of this application provides a computer-readable storage medium that has computer-executable instructions stored therein. When the computer-executable instructions are executed by a processor, the processor is caused to perform the method for training an image processing model according to the embodiments of this application.

In some embodiments, the computer-readable storage medium may be a memory such as an FRAM, a ROM, a PROM, an EPROM, an EEPROM, a flash memory, a magnetic surface memory, an optical disk, or a CD-ROM; or may be various devices including one or any combination of the foregoing memories.

In some embodiments, the computer-executable instruction may be written in any form of programming language (including a compiled or interpreted language, or a declarative or procedural language) by using a form of a program, software, a software module, a script, or code, and may be deployed in any form, including being deployed as an independent program or being deployed as a module, a component, a subroutine, or another unit suitable for use in a computing environment.

For example, the computer-executable instruction may, but do not necessarily, correspond to a file in a file system, and may be stored in a part of a file that saves another program or data, for example, be stored in one or more scripts in a hypertext markup language (HTML) file, stored in a single file dedicated to a program in discussion, or stored in a plurality of collaborative files (for example, be stored in files of one or more modules, subprograms, or code parts).

For example, the computer-executable instruction may be deployed to be executed on an electronic device, or executed on a plurality of electronic devices located at the same location, or executed on a plurality of electronic devices that are distributed in a plurality of locations and interconnected through a communication network.

The embodiments of this application have the following beneficial technical effects.

In the embodiments of this application, a triplet training sample including a source image, a template image, and a true value image is obtained, and face swapping is performed on the source image and the template image through a first image processing model to obtain a first face-swapped image, where the first image processing model is of a re-parameterization structure. A characteristic of structural re-parameterization causes the first image processing model to be more lightweight in an application stage, thereby reducing resource consumption when the model is applied. A pre-trained second image processing model corresponding to the first image processing model is obtained, and a fusion loss function of the first image processing model is calculated according to the second image processing model, the first face-swapped image, and the true value image, which is equal to that the pre-trained second image processing model is used to assist in training, thereby helping the first image processing model to learn a capability of the second image processing model. Finally, the first image processing model is trained according to the fusion loss function, and when a training convergence condition of the first image processing model is reached, a model parameter of the first image processing model is determined. The finally obtained first image processing model may achieve lightweight application, and can have high accuracy.

In the embodiments of this application, a first training sample set is obtained, where the first training sample set includes at least one triplet training sample, and the triplet training sample includes: a source image, a template image, and a true value image; processing on the first training sample set is performed through a first image processing model to obtain a first face-swapped image, where the first image processing model is of a re-parameterization structure; a second image processing model corresponding to the first image processing model is obtained, where the second image processing model is a pre-trained image processing model, and a model parameter of the second image processing model is fixed; a fusion loss function of the first image processing model according to the second image processing model and the first face-swapped image is calculated; and the first image processing model is trained according to the fusion loss function, and a model parameter of the first image processing model is determined when a training convergence condition of the first image processing model is reached. Therefore, since the first image processing model is of a re-parameterization structure, a structure of the first image processing model during training is complex. In this way, the first image processing model has a high processing capability and can learn complex data. During testing, the structure is simple. This can reduce time consumption during testing and reduce floating point operations, facilitating deployment on a mobile terminal. In addition, by using the second image processing model to perform training, accuracy of a small-scale image processing model can be stably improved without increasing a total number of training samples and without the need for retraining. This is applicable to most neural network models and data. Through a manner of knowledge distillation, training of the small-scale image processing model is implemented. While training accuracy is ensured, overfitting of neural network models is reduced, and a generalization ability of the neural network models is enhanced. This makes it easier to deploy the image processing model in the mobile terminal and realize large-scale application of the image processing model.

By denoising the first training sample set, designs for different face-swapped scenarios such as film character production, game character design, a virtual image, privacy protection, and the like can be implemented, making processing of the different face-swapped scenarios more flexible and allowing a user to flexibly select a training sample when implementing a face swapping function.

The foregoing are merely descriptions of embodiments of this application, but are not intended to limit a protection scope of this application. Any modification, equivalent replacement, and improvement made within the spirit and principle of the embodiments of this application shall fall within the scope of the embodiments of this application.

What is claimed is:

1. A model training method, performed by an electronic device, comprising:

obtaining a training sample set including a triplet training sample, the triplet training sample including a source image, a template image, and a true value image, wherein the source image is obtained by:

obtaining a face image collected by a terminal in a use environment of a first image processing model;

performing image augmentation processing on the face image;

determining a corresponding face position based on a processing result of the image augmentation, and intercepting a face image including a background image based on the face position; and cropping the face image to obtain the source image;

performing face swapping on the source image and the template image through the first image processing model to obtain a first face-swapped image, the first image processing model being of a re-parameterization structure;

obtaining a second image processing model corresponding to the first image processing model, the second image processing model being a pre-trained image processing model;

calculating a fusion loss function of the first image processing model according to the second image processing model, the first face-swapped image, and the true value image, comprising:

obtaining a second face-swapped image outputted by the second image processing model, and calculating a reconstruction loss function of the first image processing model using the first face-swapped image and the second face-swapped image;

calculating a feature loss function of the first image processing model based on the first face-swapped image and the second face-swapped image;

calculating an estimation loss function of the first image processing model based on the first face-swapped image and the source image;

calculating an adversarial loss function of the first image processing model based on the first face-swapped image and the true value image; and performing fusion processing on the reconstruction loss function, the feature loss function, the estimation loss function, and the adversarial loss function, to obtain the fusion loss function of the first image processing model; and training the first image processing model according to the fusion loss function, and determining a model parameter of the first image processing model in response to a training convergence condition of the first image processing model being reached.

2. The model training method according to claim 1, wherein the training sample set is a first training sample set;

the method further comprising:

determining a dynamic noise threshold matching a use environment of the first image processing model; and performing denoising processing on the first training sample set according to the dynamic noise threshold, to form a second training sample set matching the dynamic noise threshold.

3. The model training method according to claim 1, wherein the training sample set is a first training sample set;

the method further comprising:

determining a fixed noise threshold corresponding to the second image processing model; and performing denoising processing on the first training sample set according to the fixed noise threshold, to form a second training sample set matching the fixed noise threshold.

4. The model training method according to claim 1, wherein calculating the reconstruction loss function of the first image processing model includes:

calculating a pixel-level difference between the first face-swapped image and the second face-swapped image; and determining the reconstruction loss function of the first image processing model according to the pixel-level difference.

5. The model training method according to claim 1, wherein calculating the feature loss function of the first image processing model includes:

performing feature extraction on the first face-swapped image through a pre-trained feature extraction network, to obtain features of a plurality of levels of the first face-swapped image;

performing feature extraction on the second face-swapped image through the pre-trained feature extraction network, to obtain features of a plurality of levels of the second face-swapped image; and determining the feature loss function of the first image processing model based on a difference between the features of the plurality of levels of the first face-swapped image and the features of the plurality of levels of the second face-swapped image.

6. The model training method according to claim 1, wherein calculating the estimation loss function of the first image processing model includes:

extracting a face-swapped image feature vector of the first face-swapped image;

extracting a source image feature vector of the source image; and calculating the estimation loss function of the first image processing model using a similarity between the face-swapped image feature vector and the source image feature vector.

7. The model training method according to claim 1, the method further comprising:

obtaining a target face image and a candidate face image to be replaced, after the first image processing model is trained and deployed in a mobile terminal;

encoding the target face image and the candidate face image through an encoder network of the first image processing model, to obtain a face image vector; and decoding the face image vector through a decoder network of the first image processing model, to obtain the second face-swapped image.

8. An electronic device comprising:

at least one memory storing one or more computer-executable instructions; and at least one processor configured to execute the one or more computer-executable instructions to:

obtain a training sample set including a triplet training sample, the triplet training sample including a source image, a template image, and a true value image, wherein the source image is obtained by:

obtaining a face image collected by a terminal in a use environment of a first image processing model;

performing image augmentation processing on the face image;

determining a corresponding face position based on a processing result of the image augmentation, and intercepting a face image including a background image based on the face position; and cropping the face image to obtain the source image;

perform face swapping on the source image and the template image through the first image processing model to obtain a face-swapped image, the first image processing model being of a re-parameterization structure;

obtain a second image processing model corresponding to the first image processing model, the second image processing model being a pre-trained image processing model;

calculate a fusion loss function of the first image processing model according to the second image processing model, the first face-swapped image, and the true value image, comprising:

obtaining a second face-swapped image outputted by the second image processing model, and calculating a reconstruction loss function of the first image processing model using the first face-swapped image and the second face-swapped image;

calculating a feature loss function of the first image processing model based on the first face-swapped image and the second face-swapped image;

calculating an estimation loss function of the first image processing model based on the first face-swapped image and the source image;

calculating an adversarial loss function of the first image processing model based on the first face-swapped image and the true value image; and performing fusion processing on the reconstruction loss function, the feature loss function, the estimation loss function, and the adversarial loss function, to obtain the fusion loss function of the first image processing model; and train the first image processing model according to the fusion loss function, and determining a model parameter of the first image processing model in response to a training convergence condition of the first image processing model being reached.

9. The electronic device according to claim 8, wherein:

the training sample set is a first training sample set; and the at least one processor is further configured to execute the one or more computer-executable instructions to:

determine a dynamic noise threshold matching a use environment of the first image processing model; and perform denoising processing on the first training sample set according to the dynamic noise threshold, to form a second training sample set matching the dynamic noise threshold.

10. The electronic device according to claim 8, wherein:

the training sample set is a first training sample set;

the at least one processor is further configured to execute the one or more computer-executable instructions to:

determine a fixed noise threshold corresponding to the second image processing model; and perform denoising processing on the first training sample set according to the fixed noise threshold, to form a second training sample set matching the fixed noise threshold.

11. The electronic device according to claim 8, wherein the at least one processor is further configured to execute the one or more computer-executable instructions to, when calculating the reconstruction loss function of the first image processing model:

calculate a pixel-level difference between the first face-swapped image and the second face-swapped image; and determine the reconstruction loss function of the first image processing model according to the pixel-level difference.

12. The electronic device according to claim 8, wherein the at least one processor is further configured to execute the one or more computer-executable instructions to, when calculating the feature loss function of the first image processing model:

perform feature extraction on the first face-swapped image through a pre-trained feature extraction network, to obtain features of a plurality of levels of the first face-swapped image;

perform feature extraction on the second face-swapped image through the pre-trained feature extraction network, to obtain features of a plurality of levels of the second face-swapped image; and determine the feature loss function of the first image processing model based on a difference between the features of the plurality of levels of the first face-swapped image and the features of the plurality of levels of the second face-swapped image.

13. The electronic device according to claim 8, wherein the at least one processor is further configured to execute the one or more computer-executable instructions to, when calculating the estimation loss function of the first image processing model:

extract a face-swapped image feature vector of the first face-swapped image;

extract a source image feature vector of the source image; and calculate the estimation loss function of the first image processing model using a similarity between the face-swapped image feature vector and the source image feature vector.

14. The electronic device according to claim 8, wherein:

the at least one processor is further configured to execute the one or more computer-executable instructions to:

obtain a target face image and a candidate face image to be replaced, after the first image processing model is trained and deployed in a mobile terminal;

encode the target face image and the candidate face image through an encoder network of the first image processing model, to obtain a face image vector; and decode the face image vector through a decoder network of the first image processing model, to obtain a second face-swapped image.

15. A non-transitory computer-readable storage medium storing one or more computer-executable instructions that, when executed by at least one processor, cause the at least one processor to:

obtain a training sample set including a triplet training sample, the triplet training sample including a source image, a template image, and a true value image, wherein the source image is obtained by:

obtaining a face image collected by a terminal in a use environment of a first image processing model;

performing image augmentation processing on the face image;

determining a corresponding face position based on a processing result of the image augmentation, and intercepting a face image including a background image based on the face position; and cropping the face image to obtain the source image;

perform face swapping on the source image and the template image through the first image processing model to obtain a first face-swapped image, the first image processing model being of a re-parameterization structure;

obtain a second image processing model corresponding to the first image processing model, the second image processing model being a pre-trained image processing model;

calculate a fusion loss function of the first image processing model according to the second image processing model, the first face-swapped image, and the true value image, comprising:

obtaining a second face-swapped image outputted by the second image processing model, and calculating a reconstruction loss function of the first image processing model using the first face-swapped image and the second face-swapped image;

calculating a feature loss function of the first image processing model based on the first face-swapped image and the second face-swapped image;

calculating an estimation loss function of the first image processing model based on the first face-swapped image and the source image;

calculating an adversarial loss function of the first image processing model based on the first face-swapped image and the true value image; and performing fusion processing on the reconstruction loss function, the feature loss function, the estimation loss function, and the adversarial loss function, to obtain the fusion loss function of the first image processing model; and train the first image processing model according to the fusion loss function, and determining a model parameter of the first image processing model in response to a training convergence condition of the first image processing model being reached.

16. The non-transitory computer-readable storage medium according to claim 15, wherein:

the training sample set is a first training sample set; and the one or more computer-executable instructions, when executed by at least one processor, further cause the at least one processor to:

determine a dynamic noise threshold matching a use environment of the first image processing model; and perform denoising processing on the first training sample set according to the dynamic noise threshold, to form a second training sample set matching the dynamic noise threshold.

* * * * *